(12) United States Patent  
Norden (10) Patent No.: US 7,096,310 B2
(45) Date of Patent: Aug. 22, 2006

(54) SWITCH CONFIGURABLE FOR A PLURALITY OF COMMUNICATION PROTOCOLS

(75) Inventor: Hahn Vo Norden, Houston, TX (US)

(73) Assignee: Hewlett-Packard Development, L.P., Houston, TX (US)

( * ) Notice: Subject to any disclaimer, the term of this patent is extended or adjusted under 35 U.S.C. 154(b) by 176 days.

(21) Appl. No.: 10/801,617

(22) Filed: Mar. 16, 2004

(65) Prior Publication Data

US 2005/0210177 A1    Sep. 22, 2005

(51) Int. Cl.
*G06F 13/00* (2006.01)
*G06F 13/36* (2006.01)

(52) U.S. Cl. ............... 710/317; 710/315; 710/316
(58) Field of Classification Search ............ 710/317
See application file for complete search history.

(56) References Cited

U.S. PATENT DOCUMENTS

| 5,734,334 | A | 3/1998 | Hsieh et al. |
| 5,905,873 | A * | 5/1999 | Hartmann et al. ......... 709/249 |
| 6,266,713 | B1 * | 7/2001 | Karanam et al. ............. 710/9 |
| 6,622,186 | B1 | 9/2003 | Moniot et al. |
| 2003/0051024 | A1 * | 3/2003 | Garnett et al. ............. 709/223 |
| 2005/0147126 | A1 * | 7/2005 | Qiu et al. .................. 370/474 |
| 2005/0193171 | A1 * | 9/2005 | Bacchus .................... 711/118 |

* cited by examiner

*Primary Examiner*—Rehana Perveen
*Assistant Examiner*—Jeremy S. Cerullo (57) ABSTRACT

In at least some embodiments of the invention, a system may comprise a plurality of electronic devices adapted to send and receive data, wherein each electronic device uses any one of a plurality of communication protocols. The system may also comprise a switch comprising a plurality of ports, each port is adapted to couple to an electronic device, wherein each port is configurable for use according to the protocol used by the electronic device coupled thereto.

20 Claims, 4 Drawing Sheets

SWITCH CONFIGURABLE FOR A PLURALITY OF COMMUNICATION PROTOCOLS

BACKGROUND

A communication protocol may permit an electronic device to transfer data to other electronic devices. Additionally, a communication protocol should permit an electronic device to interpret data received from another device. Often, as new electronic devices are developed, new communication protocols also are developed for use with those devices. Furthermore, new communication protocols are continually being sought to increase speed and/or efficiency of communication between electronic devices. Unfortunately, many communication protocols are not compatible with each other. Additionally, many electronic devices are designed to support only a particular protocol. Therefore, electronic devices that support these incompatible protocols are unable to easily communicate with each other.

SUMMARY

In at least some embodiments of the invention, a system may comprise a plurality of electronic devices adapted to send and receive data, wherein each electronic device uses any one of a plurality of communication protocols. The system may also comprise a switch comprising a plurality of ports, each port is adapted to couple to an electronic device, wherein each port is configurable for use according to the protocol used by the electronic device coupled thereto.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
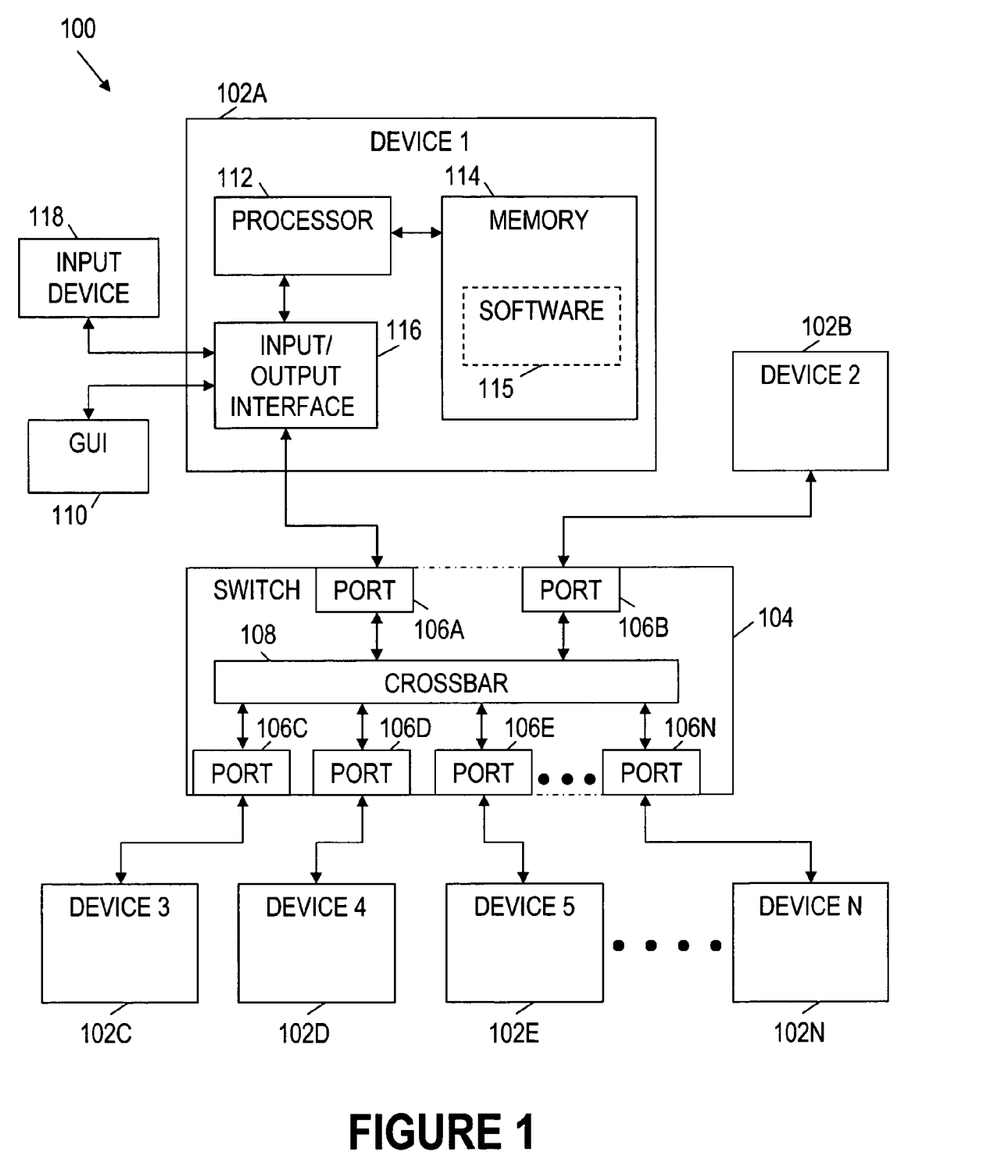
FIG. 1 illustrates a block diagram of a system in accordance with embodiments of the invention.

FIG. 1 illustrates a block diagram of a system 100 in accordance with embodiments of the invention. As illustrated in FIG. 1, the system 100 may comprise a plurality of electronic devices 102A–102N that couple to a switch 104. In at least some embodiments, the switch 104 may comprise a plurality of configurable ports 106A–106N that couple to a crossbar 108. The ports 106A–106N may each comprise circuitry for receiving data from electronic devices 102A–102N and sending data to the electronic devices 102A–102N. The ports 106A–106N also may comprise circuitry and/or embedded software for configuring the ports for use with a particular protocol. The switch 104 may permit the electronic devices 102A–102N to send data to and receive data from each other even when some of the devices 102A–102N implement communication protocols that are not compatible with each other. In at least some embodiments, each of the electronic devices 102A–102N may implement a single communication protocol that is different than and/or incompatible with protocols implemented by others of the devices 102A–102N. The single communication protocol mentioned above may be any of many existing communication protocols. Some examples of existing communication protocols include PCI-X (Peripheral Component Interconnect Extended) and PCI Express (Peripheral Component Interconnect Express). Additionally, other protocols now known or later developed may be implemented in some embodiments of the invention.

As shown in FIG. 1, the electronic device 102A may comprise a computer system having a processor 112 coupled to an input/output interface 116 and a memory 114 that stores software 115. Similarly, the electronic devices 102B–102N also may comprise computer systems. Alternatively, the electronic devices 102A–102N may be representative of computer peripherals (e.g., printers, scanners, modems, network interface cards, sound cards, graphics cards, digital cameras, and/or video recorders). In at least some embodiments, a combination of computers, computer components, and/or computer peripherals may couple to the switch 104 as electronic devices 102A–102N that implement one or more communication protocols. In some embodiments, the electronic devices 102A–102N may be integrated circuits ("chips") that each communicate using a particular communication protocol.

An example of how the electronic devices 102A–102N may be configured for use with the switch 104 will now be given using the electronic device 102A as an example. As shown in FIG. 1, the electronic device 102A may couple to an input device 118 and a graphic user interface (GUI) 110 using the input/output interface 116. The input device 118 may comprise a keyboard and/or a mouse. In at least some embodiments, a user may configure each port 106A–106N of the switch 104 for use with a particular communication protocol selected from a plurality of predetermined protocols as will later be described. Accordingly, each of the ports 106A–106N may be configured for use with the communication protocol of the electronic device 102A or any of the electronic devices 102A–102N that couple thereto. In some embodiments, a user may access a software application 115 stored in the memory 114 and executed by the processor 112, whereby an interactive window is presented on the graphic user interface 110. For example, the memory 114 may be a ROM (read-only memory) that comprises the software 115. During an initialization phase or a POST test (power on self test) of the electronic device 102A, the software (i.e., computer readable instructions) 115 may be accessed and executed by the processor 112 to provide the interactive window described above. Alternatively, in some embodiments, the software 115 stored in the memory 114 may be accessed and executed by the processor 112 when the electronic device 102A has been coupled recently to one of the ports 106A–106N.

Figure 2:
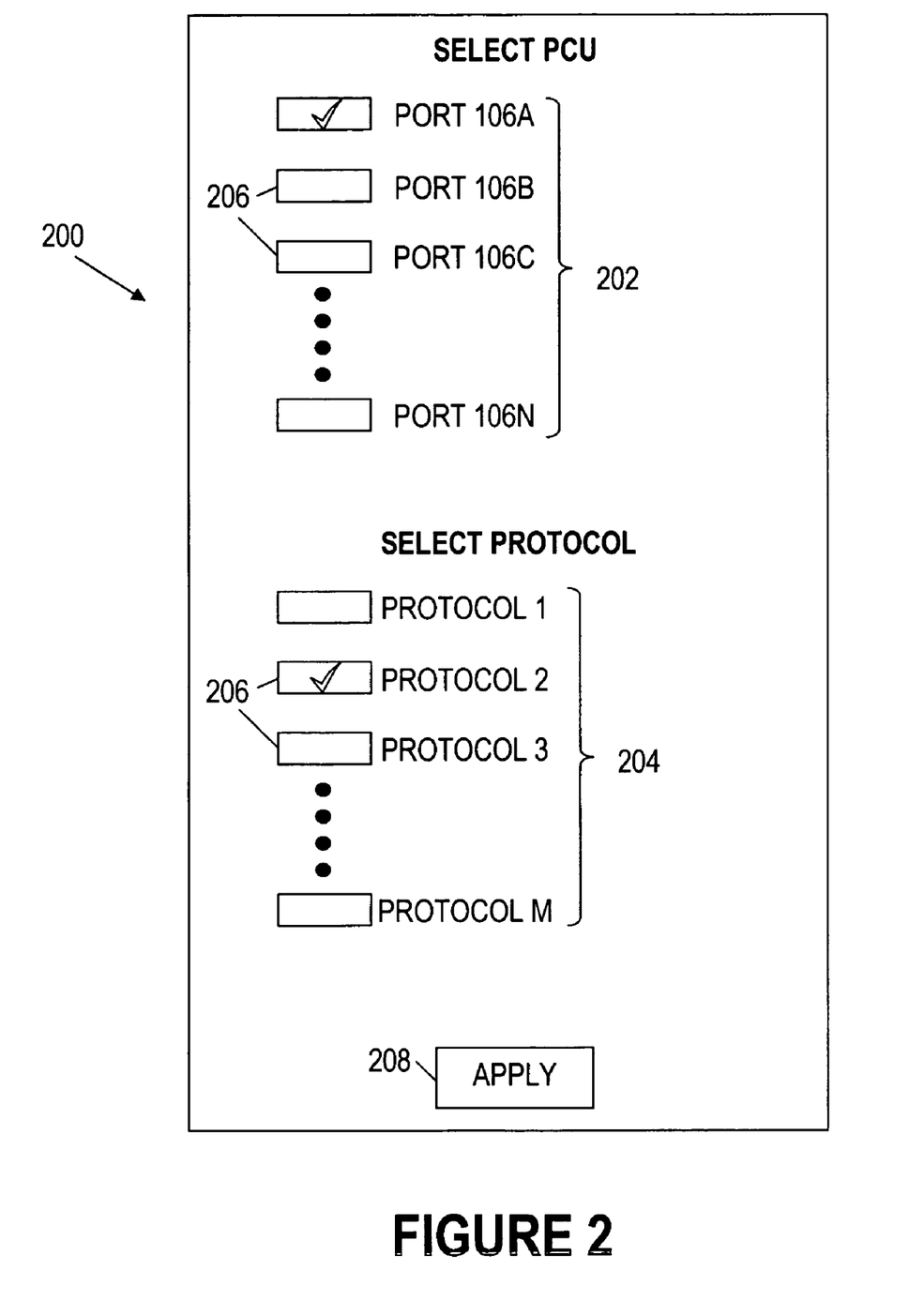
FIG. 2 illustrates a screenshot of a software application in accordance with embodiments of the invention.

FIG. 2 illustrates an exemplary application window 200 provided by executing the software application 115. In accordance with some embodiments, the application window 200 may be used for configuring the ports 106A–106N of the switch 104 to use a particular communication protocol. As shown in FIG. 2, the window 200 may display a list 202 of the ports 106A–106N of the switch 104 and a list 204 of protocols (PROTOCOL 1 through PROTOCOL N) that are compatible with each port the switch 104.

Using an input device 118, a user may select one of the ports 106A–106N and one of a plurality "N" protocols (e.g., by clicking on a button 206 in each of the lists 202 and 204 using a mouse). As shown in FIG. 2, a user may select the port 106A from the list 202 and the protocol 2 (e.g., protocol 2 may correspond to the PCI-X protocol) from the list 204. Upon clicking the apply button 208, the processor 112 of a device (e.g., the device 102A) coupled to the port 106A may communicate with the selected port whereby the port (e.g., the port 106A) may be programmed, or otherwise configured, for use with the selected protocol (e.g., protocol 2). Specifically, in some embodiments, a configuration unit (e.g., a register) in the selected port may receive configuration data from the processor 112 of the coupled device and provide a control signal to configure the port 106A. The same procedure may be used to configure and/or re-configure all of the ports 106A–106N of the switch 104. As previously explained, the execution of the software application 115 may occur during an initialization phase of the electronic device coupled to a port (e.g., when the electronic device is powered on from an off state) or when an electronic device has been coupled recently to one of the ports 106A–106N of the switch 104.

In some embodiments, each of the ports 106A–106N may be configured automatically for use with a device (e.g., one of the electronic devices 102A–102N) coupled thereto. In such embodiments, the application window 200 described above may not be used. Instead, a default configuration may be used (e.g., each of the ports 106A–106N may implement the same configuration that was used previously). Additionally or alternatively, when one of the electronic devices 102A–102N (e.g., the device 102A) is newly coupled to one of the ports 106A–106N (e.g., the port 106A) or upon initialization of one of the electronic devices 102A–102N (e.g., the device 102A), that electronic device (102A) may automatically communicate with the port (106A) such that the port (106A) is configured for use with the electronic device (102A). In some embodiments, the ports 106A–106N may each include logic and/or a configuration register that receives information (e.g., configuration data) from one of the electronic devices 102A–102N coupled thereto, whereby the port is automatically configured for use with the coupled electronic device (e.g., the processor 112 of the device 102A may send configuration data to the port 106A).

In some embodiments, when one of the ports 106A–106N (e.g., 106A) receives input data (i.e., a request) from a coupled electronic device (e.g., 102A), that port (106A) may gather information such as request type and payload length (i.e., the amount of data) by analyzing header and address information included with the data. Additionally, the port 106A may convert the data to a protocol that is compatible with the crossbar 108. The protocol used by the crossbar 108 may be different than the protocols implemented by the ports 106A–106N. Alternatively, the crossbar protocol may be the same as the protocol implemented by at least one of the ports 106A–106N. In some embodiments, the process of converting a protocol used by one of the ports 106A–106N to a crossbar protocol may comprise dividing the payload described above into predetermined data block sizes.

The crossbar 108 may transfer the received data from one port (e.g., 106A) to another (destination) port (e.g., one of the ports 106B–106N) according to the address and/or other destination information included with the data (e.g., if the destination address corresponds with the device 102B, then the destination port may be the port 106B, which is coupled to the device 102B according to FIG. 1). When the a destination port (e.g., the port 106B) receives data from the crossbar 108, the data may be converted into the protocol used by the electronic device (e.g., the device 102B) that couples to the destination port (106B) such that the data may be received and correctly interpreted by the coupled electronic device (102B). In some embodiments, the crossbar 108 may include buffers that coordinate the transfer of data between the ports 106A–106N coupled to the crossbar 108.

Figure 3:
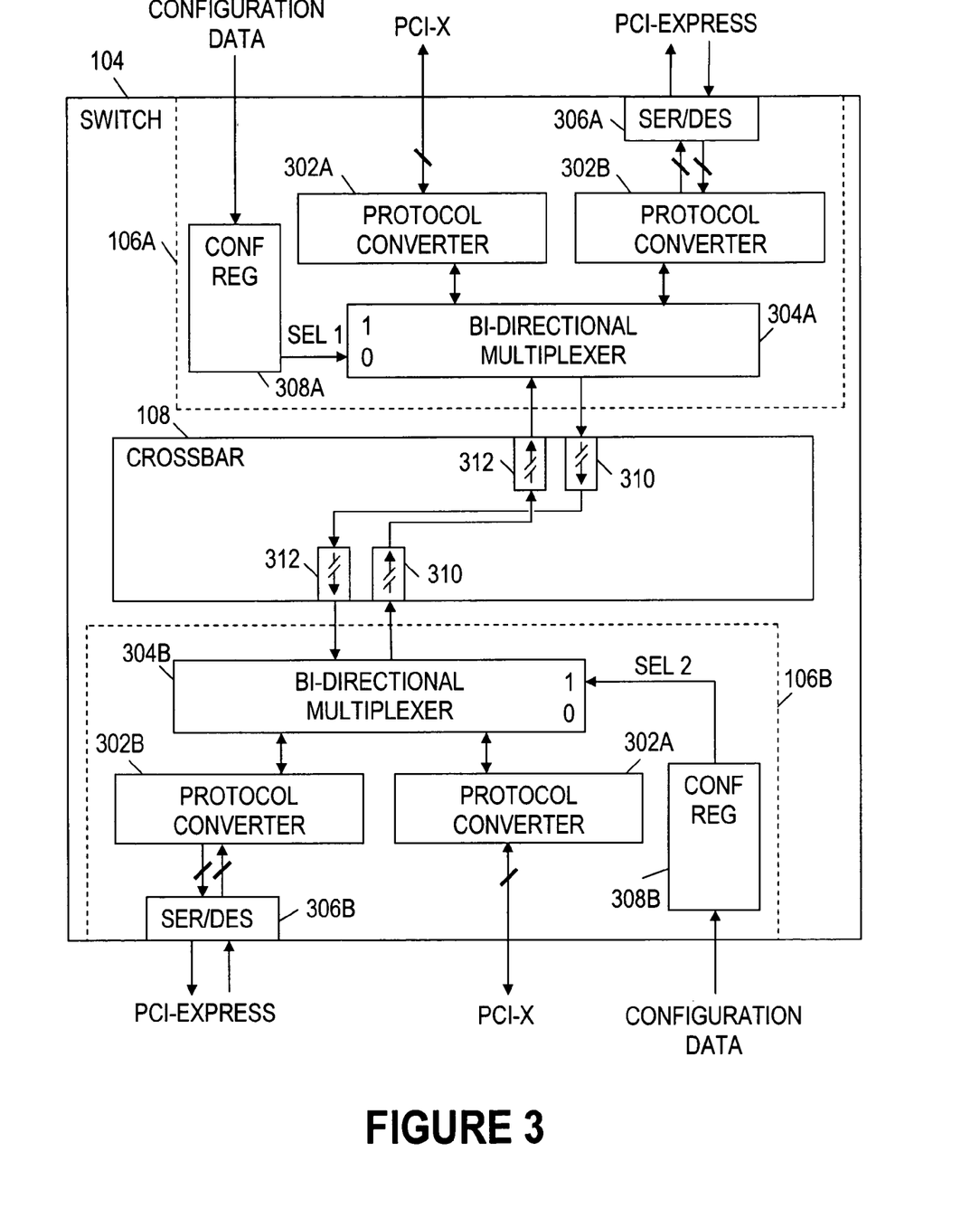
FIG. 3 illustrates a block diagram of the switch shown in FIG. 1 in accordance with embodiments of the invention.

FIG. 3 illustrates a block diagram of a switch 104 in accordance with embodiments of the invention. As shown in FIG. 3, the switch 104 may comprise ports 106A and 106B and a crossbar 108 as previously described. The ports 106A and 106B may transfer data using any of a plurality of communication protocols such as PCI-X or PCI Express. As previously explained, some communication protocols, such as PCI-X and PCI Express, may not be compatible with each other. For instance, the PCI-X protocol uses multiple ("parallel") data streams to send and receive data, while PCI Express uses a single ("serial") input and output data stream.

In some embodiments, electronic devices (e.g., the devices 102A and 102B) may couple to the ports 106A and 106B using a wired or wireless connection. If a wired connection is used, each of the ports 106A and 106B may comprise a connector (not shown) having sufficient pins to support the protocols. For example, if the PCI-X protocol uses 16 parallel data lines and the PCI Express protocol uses 4 data lines, a connector of each of the ports 106A, 106B may comprise at least 20 data lines.

As shown in FIG. 3, the port 106A may comprise protocol converters 302A and 302B, a bidirectional multiplexer 304A, a serializer/deserializer 306A, and a configuration register 308. The protocol converter 302A may be adapted to convert data from a PCI-X protocol to a crossbar protocol, while the protocol converter 302B may be adapted to convert data from a PCI Express protocol to a crossbar protocol. As show, the protocol converter 302B may couple to the serializer/deserializer 306A and the multiplexer 304A. Both protocol converters 302A and 302B may couple to the crossbar 108 via the bidirectional multiplexer 304A which may be controlled by a select line (e.g., "SEL 1"). The select line may comprise one or more bits according to the number of protocol converters 302A, 302B implemented in a port 106. For example, if two protocols converters 302A, 302B are used for the port 106A, SEL 1 may comprise a single bit configured as a "0" (low) or a "1" (high) value. Alternatively, SEL 1 may comprise a plurality of bits (e.g., if the port 106A uses more than two protocol converters). In some embodiments, the select line signal may be provided by the configuration register 308A according to configuration data received from a processor 112 of an electronic device (e.g., 102A) as previously described. The port 106B may comprise the same components and functionality as the port 106A described above.

As shown in FIG. 3, select line "SEL 1" may control the multiplexer 304A of port 106A and select line "SEL 2" may control the multiplexer 304B of port 106B. If a select line is set to "1," then data may be streamed in and out of the assigned port using the PCI-X protocol. For example, if the SEL 1 is set to "1," then data be streamed in and out of the protocol converter 302A and an associated data path of the port 106A using the PCI-X protocol. Alternatively, if a select line is set to "0," then data may be streamed in and out of the assigned port using the PCI Express protocol. For example, if the SEL 2 is set to "0," then data be streamed in and out of the protocol converter 302A and an associated data path of the port 106B using the PCI Express protocol. In at least some embodiments, the select lines may be independently configured thereby permitting ports 106A, 106B to couple to devices (e.g., the devices 102A and 102B) implementing different communication protocols. In some embodiments, a default protocol may automatically be selected for the ports 106A and 106B. For example, the select lines (e.g., "SEL 1" and "SEL 2") may automatically be set to a particular value (e.g., 0), whereby a protocol converter 302A, 302B and an associated data path are used.

In some embodiments, the configuration data provided to the configuration registers 308A, 308B may be provided manually. For example, in some embodiments, dual in-line (DIP) switches (not shown) coupled to a power source may be used to permit a user to manually select "0" (low) or "1" (high) values for one or more bits that may be input to the configuration registers 308A, 308B as the configuration data.

The switch 104 shown in FIG. 3 may be configured in a variety of ways according to the protocols used by the electronic devices (e.g., the devices 102a and 102B) that couple to the ports 106A and 106B and the protocol implemented by the crossbar 108. An illustration of how the switch 104 may be configured is shown in the Tables 1, 2, and 3 below.

TABLE 1

| Configuration | Port 106A Protocol | Crossbar Protocol | Port 106B Protocol |
| --- | --- | --- | --- |
| 1 | PCI-X | PCI-X | PCI-X |
| 2 | PCI-X | PCI-X | PCI Express |
| 3 | PCI-X | PCI-X | Other |
| 4 | PCI-X | PCI Express | PCI-X |
| 5 | PCI-X | PCI Express | PCI Express |
| 6 | PCI-X | PCI Express | Other |
| 7 | PCI-X | Other | PCI-X |
| 8 | PCI-X | Other | PCI Express |
| 9 | PCI-X | Other | Other |

TABLE 2

| Configuration | Device 1 | Crossbar | Device 2 |
| --- | --- | --- | --- |
| 1 | PCI Express | PCI-X | PCI-X |
| 2 | PCI Express | PCI-X | PCI Express |
| 3 | PCI Express | PCI-X | Other |
| 4 | PCI Express | PCI Express | PCI-X |
| 5 | PCI Express | PCI Express | PCI Express |
| 6 | PCI Express | PCI Express | Other |
| 7 | PCI Express | Other | PCI-X |
| 8 | PCI Express | Other | PCI Express |
| 9 | PCI Express | Other | Other |

TABLE 3

| Configuration | Device 1 | Crossbar | Device 2 |
| --- | --- | --- | --- |
| 1 | Other | PCI-X | PCI-X |
| 2 | Other | PCI-X | PCI Express |
| 3 | Other | PCI-X | Other |
| 4 | Other | PCI Express | PCI-X |
| 5 | Other | PCI Express | PCI Express |
| 6 | Other | PCI Express | Other |
| 7 | Other | Other | PCI-X |
| 8 | Other | Other | PCI Express |
| 9 | Other | Other | Other |

As shown in Table 1, the port 106A may be configured for use with the PCI-X protocol, while the crossbar 108 and the port 106B may each be configured for use with the same protocol or other protocols. As shown in Table 2, the port 106A may be configured for use with the PCI Express protocol, while the crossbar 108 and the port 106B may each be configured for use with the same protocol or other protocols. As shown in Table 3, the port 106A may be configured for use with other protocols (i.e., not PCI-X or PCI Express), while the crossbar 108 and the port 106B may each be configured use with for the same protocol or other protocols (including PCI-X and PCI Express). Once the switch 104 is configured as previously described, data may be communicated from one device (e.g., the device 102A) to another device (e.g., the device 102B) through the switch 104.

As an example, consider a switch 104, wherein the port 106A is configured for use with the PCI Express protocol, the crossbus 108 is configured for use with an "other" protocol (i.e., not PCI-X or PCI Express), and the port 106B is configured for use with the PCI-X protocol. When the port 106A receives input data from a coupled device (e.g., the device 102A) the data stream may be converted from a serial data stream as defined by the PCI Express protocol to a plurality of parallel data streams by the serializer/deserializer 306A.

Thereafter, the PCI Express protocol converter 302B of the port 106A may gather information (e.g., request type, payload length) from the header and address information from the address portion (e.g., the first 8 bytes) of the payload as defined for the PCI Express protocol. The PCI Express protocol converter 302B of the port 106A also may queue (i.e., buffer) data into 256-bit blocks, thereby converting the data for use by an "other" protocol of the crossbar 108. The input buffers 310 may coordinate (i.e., queue) the transfer of data across the crossbar 10, wherein the request and address information described above may be used to transfer the request and accompanying data to the correct output buffer 312 and an associated destination port as previously described. If the destination address corresponds to a device coupled to the port 106B, then the PCI-X protocol converter 302A of the port 106B and associated data path may output a command and 256-bit data blocks onto a 16-bit bus as defined for the PCI-X protocol. The data may then be output to an electronic device (e.g., the device 102B) coupled to the port 104B. In some embodiments, the data may be output from the switch 104 at a rate of 2.5 Gb/s.

Figure 4:
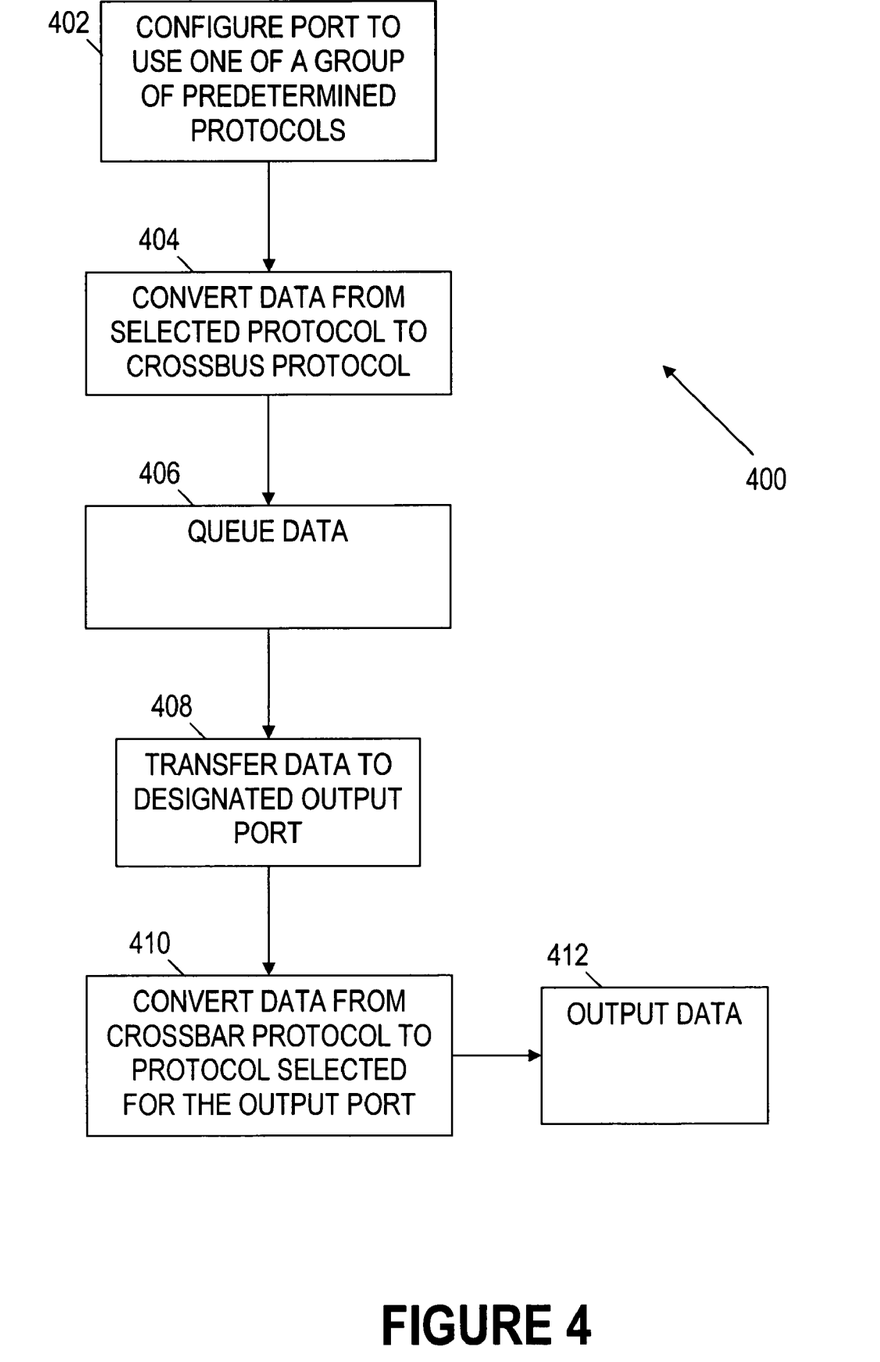
FIG. 4 illustrates a flowchart of a protocol switching method in accordance with embodiments of the invention.

FIG. 4 illustrates a block diagram of a method 400 in accordance with embodiments of the invention. As shown in FIG. 4, the method 400 may comprise configuring a port of a switch 104 to use one of a group of predetermined protocols (block 402). For example, a port may be configured for use with the PCI-X protocol, PCI Express protocol, or other protocols as previously explained. Also, the configuration of the port may be user-controllable or automated as described above. At block 404, the data may be converted from a selected protocol (e.g., the PCI-X protocol) to a crossbar protocol. The data may then be queued (i.e., buffered) by a crossbar (at block 406) and transferred (at block 408) to an output port designated by information contained in the data. At the output port, the data may be converted from the crossbar protocol to a protocol (e.g., PCI Express) selected for the output port (block 410). For example, selecting a protocol for the output port may comprise implementing user-controlled or automated techniques such as those previously described to select the PCI Express, or another protocol, according to the device coupled to the output port. Once the data is converted according to the protocol selected for the output port (block 410), the data may be output (block 412) to a device that couples to the output port.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of electronic devices adapted to send and receive data, wherein each electronic device uses any one of a plurality of communication protocols; and
   a switch comprising a plurality of ports, each port is adapted to couple to an electronic device, wherein each port is configurable for use according to the protocol used by the electronic device coupled thereto,
   wherein each port comprises a plurality of protocol converters, each protocol converter being associated with a separate data path, and
   wherein the switch comprises logic that selects a protocol converter and a data path for each port.

2. The system of claim 1 wherein the plurality of communication protocols comprise PCI-X and PCI Express.

3. The system of claim 1 wherein a port is configured for use with an electronic device upon initialization of the electronic device coupled thereto.

4. The system of claim 1 wherein the protocol used by one of the plurality of ports is configurable by a user of the electronic device coupled to the port.

5. The system of claim 1 wherein each port is configured automatically according to the protocol of the electronic device coupled thereto.

6. The system of claim 1 wherein the plurality of electronic devices comprise at least two devices selected from the group consisting of computers, computer components, and computer peripherals.

7. A switch adapted to couple to a plurality of devices that each implement any one of a plurality of communication protocols, the switch comprising:
   a plurality of ports, wherein each port is adaptable to couple to one of the devices and to receive data from and transmit data to said device and programmable to implement the communication protocol implemented by said device; and
   a crossbar coupled to the ports, wherein the crossbar is operable to direct data flow between the ports according to destination information provided with data received by the switch,
   wherein each port comprises a plurality of protocol converters that convert data from the communication protocols of the devices to a protocol used by the crossbar and vice versa,
   wherein each port comprises logic coupled to the protocol converters and the crossbar, wherein the logic selects a protocol converter and an associated data path to use according to configuration data.

8. The switch of claim 7 wherein a protocol converter is automatically selected for use according to the configuration data.

9. The switch of claim 7 wherein the configuration data is provided according to a user controlled interface.

10. The switch of claim 7 wherein the logic comprises a bi-directional multiplexer.

11. The switch of claim 7 wherein the logic comprises a configuration register.

12. The switch of claim 7 wherein each port comprises a serializer/deserializer coupled to at least one of the protocol converters, the serializer/deserializer converts data from a serial data path to a parallel data path and vice versa.

13. A method, comprising:
   receiving data according to any one of a plurality of predetermined protocols;
   converting the data from the protocol of the received data to a crossbar protocol;
   converting the data from the crossbar protocol to a selected one of the plurality of predetermined protocols; and
   outputting the data according to the selected protocol
   wherein receiving data according to any one of a plurality of predetermined protocols comprises selecting one of a plurality of data paths, wherein each data path is associated with one of the predetermined protocols and wherein said selecting is user controlled.

14. The method of claim 13, wherein the protocol of said received data is determined by the protocol used by a device supplying the data, and the selected protocol is determined by the protocol used by a destination device for the output data.

15. The method of claim 13 wherein receiving data according to any one of a plurality of predetermined protocols comprises serializing or deserializing the data.

16. The method of claim 13 wherein said selecting is automated.

17. A system, comprising:
   a plurality of electronic devices adapted to send and receive data, each device using any one of a plurality of communication protocols;
   a switch comprising a plurality of ports, each port adapted to couple to one of the plurality of electronic devices, the switch comprises also a crossbar coupled to the ports, wherein each port comprises:
     means for receiving data according to any of the plurality of communication protocols;
     means for converting the communication protocol of the received data to a crossbar protocol;
     means for converting data from the crossbar protocol to any of the plurality of communication protocols; and
     means for selecting one of a plurality of protocol converters and data paths for use with the electronic device coupled thereto.

18. The system of claim 17 wherein the switch further comprises means for queuing data.

19. The system of claim 17 wherein each port further comprises means for automatically being configured to use a communication protocol of the electronic device coupled thereto.

20. The system of claim 17 further comprising means for configuring each port to use a communication protocol of the electronic device coupled thereto according to a user controlled interface.

* * * * *

UNITED STATES PATENT AND TRADEMARK OFFICE
CERTIFICATE OF CORRECTION

| | | |
|---|---|---|
| PATENT NO. | : 7,096,310 B2 | Page 1 of 1 |
| APPLICATION NO. | : 10/801617 | |
| DATED | : August 22, 2006 | |
| INVENTOR(S) | : Hahn Vo Norden | |

It is certified that error appears in the above-identified patent and that said Letters Patent is hereby corrected as shown below:

On the Title Page, Item (73), under "Assignee", line 1, after "Development" insert -- Company --.

Signed and Sealed this

Twenty-eighth Day of July, 2009

JOHN DOLL
*Acting Director of the United States Patent and Trademark Office*